(No Model.)

G. A. GUNTHER.
FISH GLOBE.

No. 415,506. Patented Nov. 19, 1889.

WITNESSES:
Fol. N. Rosenbaum.
W. Reimherr.

INVENTOR
George A. Gunther
BY
Gregener
ATTORNEYS.

UNITED STATES PATENT OFFICE.

GEORGE A. GUNTHER, OF NEW YORK, N. Y.

FISH-GLOBE.

SPECIFICATION forming part of Letters Patent No. 415,506, dated November 19, 1889.

Application filed July 3, 1889. Serial No. 316,390. (No model.)

*To all whom it may concern:*

Be it known that I, GEORGE A. GUNTHER, of the city, county, and State of New York, a citizen of the United States, have invented certain new and useful Improvements in Fish-Globes, of which the following is a specification.

This invention relates to an improved fish-globe from which the sediments can be removed without interfering with the fish and the water replaced without handling or disturbing the fish in the globe; and the invention consists of a fish-globe provided at its lowest part with an aperture and with outlet channels or passages extending from said aperture in upward direction, said channels serving for removing the sediments and permitting the refilling of the globe without removing the fish.

Figure 1:
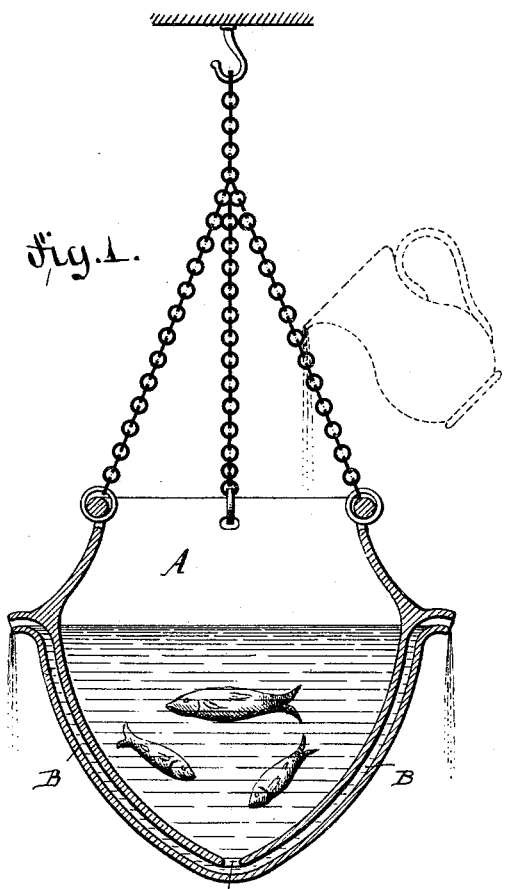
Figure 2:
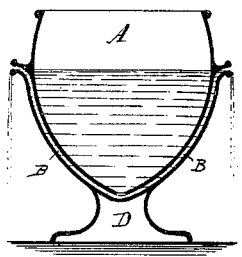
Figure 3:
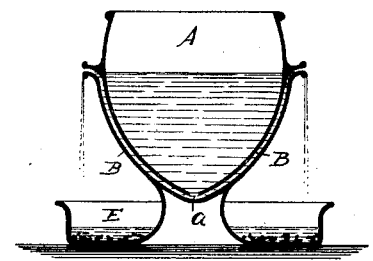
Figure 4:
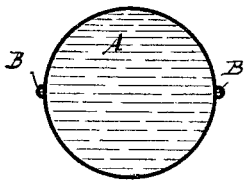

In the accompanying drawings, Figure 1 represents a vertical central section of my improved fish-globe, showing the same suspended by means of hanger-chains; and Figs. 2 and 3 are modified constructions of the globe provided, respectively, with a stand and with a basin for receiving the overflow from the globe. Fig. 4 is a horizontal sectional view of the fish-globe.

Similar letters of reference indicate corresponding parts.

Referring to the drawings, A represents a fish-globe, which is preferably made of glass, and which is provided at the lowest part of its bottom with an aperture $a$, that communicates with one or more outlet channels or passages B B, which extend from the aperture $a$ along the outside of the globe in upward direction, the lower edge of the discharge-apertures at the upper ends of the channels B B being on a level with the level of the water in the globe. The channels B may be made from one-quarter to one-half an inch in diameter and formed integral with the body of the globe A. The sediment settles at the bottom of the globe and passes through the aperture $a$, and is conducted through the channel or channels B B in upward direction and discharged through the openings at the upper ends of the same. The water in the globe may be changed by pouring it in from a pitcher, as indicated in dotted lines in Fig. 1, the stale water being discharged with the sediments through the outlet-openings of the channels B B. This has the advantage that the fish are not at all disturbed and do not require to be handled or taken out of the globe.

The globe A may be suspended by means of hanger-chains from a suitable support, as shown in Fig. 1, or supported on a stand D, as shown in Fig. 2, in which latter case, also, a receptacle or catch-basin E for the overflow of water and sediment may be arranged as shown in Fig. 3, so that the latter may be collected and utilized as a fertilizer for aquatic plants, ferns, &c.

Having thus described my invention, I claim as new and desire to secure by Letters Patent—

A fish-globe tapering to a contracted outlet at the lowest point in the globe and provided with a discharge-passage extending from said outlet up to the normal level of the water in the globe, whereby sediment is automatically discharged on the addition of fresh water, substantially as specified.

In testimony that I claim the foregoing as my invention I have signed my name in presence of two subscribing witnesses.

GEORGE A. GUNTHER.

Witnesses:
B. B. WILEY,
JOHN N. REEVE.